(12) United States Patent
Jenison et al.

(10) Patent No.: US 10,186,931 B2
(45) Date of Patent: Jan. 22, 2019

(54) ELECTRICAL GENERATOR HEAT MANAGEMENT SYSTEM

(71) Applicant: Champion Engine Technology, LLC, Sussex, WI (US)

(72) Inventors: Leigh Jenison, Hartland, WI (US); Ian Schmit, Cedarburg, WI (US); James J. Dehn, Brookfield, WI (US); Mark J. Sarder, Waukesha, WI (US)

(73) Assignee: Champion Engine Technology, LLC, Sussex, WI (US)

( * ) Notice: Subject to any disclaimer, the term of this patent is extended or adjusted under 35 U.S.C. 154(b) by 337 days.

(21) Appl. No.: 14/703,284

(22) Filed: May 4, 2015

(65) Prior Publication Data

US 2016/0233739 A1 Aug. 11, 2016

Related U.S. Application Data

(60) Provisional application No. 62/113,258, filed on Feb. 6, 2015.

(51) Int. Cl.
*H02K 7/00* (2006.01)
*H02K 7/18* (2006.01)
*F02B 63/04* (2006.01)

(52) U.S. Cl.
CPC ......... *H02K 7/1815* (2013.01); *F02B 63/044* (2013.01)

(58) Field of Classification Search
CPC ............. H02K 7/1815; F05D 2260/608; F02B 63/044
USPC .................. 290/1 A, 2; 123/2, 3; 310/58
See application file for complete search history.

(56) References Cited

U.S. PATENT DOCUMENTS

| 4,265,332 | A | * | 5/1981 | Presnall | F01N 3/05 165/52 |
|---|---|---|---|---|---|
| 4,495,901 | A | * | 1/1985 | Nannini | F02B 63/04 123/195 C |
| 4,608,946 | A | | 9/1986 | Tanaka et al. | |
| 4,702,201 | A | * | 10/1987 | Odo | F02B 63/04 123/2 |
| 4,741,411 | A | * | 5/1988 | Stricker | F01N 3/05 181/240 |
| 5,603,297 | A | * | 2/1997 | Wolf | B60R 13/0869 123/195 C |
| 5,642,702 | A | * | 7/1997 | Kouchi | F02B 63/04 123/198 E |
| 5,899,174 | A | * | 5/1999 | Anderson | F02B 63/04 123/2 |

(Continued)

FOREIGN PATENT DOCUMENTS

CN 104314676 A 1/2015

*Primary Examiner* — Julio C. Gonzalez
(74) *Attorney, Agent, or Firm* — Ziolkowski Patent Solutions Group, SC

(57) ABSTRACT

A generator includes a multi-chamber generator enclosure, an engine mounted within the multi-chamber generator enclosure, and an alternator driven by the engine and positioned within at least one chamber of the multi-chamber generator enclosure. The generator also includes an exhaust system operatively coupled to the engine and extending from the engine through at least the at least one chamber of the multi-chamber generator enclosure having the alternator therein, and a heat shield substantially surrounding the exhaust system in the at least one chamber of the multi-chamber enclosure generator containing the alternator.

28 Claims, 7 Drawing Sheets

(56) References Cited

U.S. PATENT DOCUMENTS

| | | | |
|---|---|---|---|
| 5,924,393 A * | 7/1999 | Kikuchi | F02B 63/04 123/2 |
| 6,376,944 B1 * | 4/2002 | Grizzle, Jr. | F02B 63/04 123/2 |
| 6,489,690 B1 * | 12/2002 | Hatsugai | F02B 63/04 123/2 |
| 6,784,574 B2 * | 8/2004 | Turner | F02B 43/00 290/1 B |
| 6,975,042 B2 * | 12/2005 | Yamada | F02B 63/04 123/2 |
| 7,314,397 B2 | 1/2008 | Sodemann et al. | |
| 7,537,070 B2 * | 5/2009 | Maslov | B60K 6/46 180/65.25 |
| 7,642,665 B2 * | 1/2010 | Konop | H02K 7/1815 123/2 |
| 8,178,985 B2 * | 5/2012 | Hirose | F02B 63/04 290/1 A |
| 2002/0000342 A1 * | 1/2002 | Yamada | E02F 9/0866 181/204 |
| 2010/0111779 A1 * | 5/2010 | Redmann | F01N 3/101 422/179 |
| 2011/0239637 A1 * | 10/2011 | Ochsner | F01N 1/14 60/320 |
| 2011/0272952 A1 * | 11/2011 | Richardson | F02B 63/04 290/1 A |
| 2013/0187392 A1 | 7/2013 | Janscha et al. | |
| 2013/0206098 A1 * | 8/2013 | Betts, Sr. | F02B 77/00 123/198 R |
| 2013/0277145 A1 * | 10/2013 | Raasch | F01N 1/084 181/259 |

\* cited by examiner

ELECTRICAL GENERATOR HEAT MANAGEMENT SYSTEM

CROSS-REFERENCE TO RELATED APPLICATION

The present application is a non-provisional of, and claims priority to, U.S. Provisional Patent Application Ser. No. 62/113,258, filed Feb. 6, 2015, the disclosure of which is incorporated herein by reference in its entirety.

BACKGROUND OF THE INVENTION

Standby generators provide a convenient source of backup electricity for homes and businesses when power outages occur in the utility grid. Standby generators may comprise a prime mover that drives an alternator to produce electricity. The prime mover may be an internal combustion engine configured to operate on a liquid fuel such as diesel and gasoline or an alternative fuel such as propane and natural gas.

Standby generators are typically housed in an enclosure for convenience and protection. However, enclosures can trap heat generated from the prime mover and the alternator, causing higher operating temperatures and reduced efficiency. While a fan may be placed within the enclosure to expel heat from the engine and the alternator, large fans not only increase the noise of the generator, but can also decrease the electrical output of the generator. Heat generated within the enclosure can adversely affect the alternator performance.

An improved cooling system for standby generators would lower the temperature within the enclosure, and in particular, across the alternator, thereby improving the overall performance of the generator.

BRIEF DESCRIPTION OF THE INVENTION

In accordance with one aspect of the invention, a generator includes a multi-chamber generator enclosure, an engine mounted within the multi-chamber generator enclosure, and an alternator driven by the engine and positioned within at least one chamber of the multi-chamber generator enclosure. The generator also includes an exhaust system operatively coupled to the engine and extending from the engine through at least the at least one chamber of the multi-chamber generator enclosure having the alternator therein, and a heat shield substantially surrounding the exhaust system in the at least one chamber of the multi-chamber enclosure generator containing the alternator.

In accordance with another aspect of the invention, an exhaust header pipe and duct system for a standby generator having an alternator is provided. The exhaust header pipe and duct system includes a header pipe coupleable to an internal combustion engine to receive exhaust therefrom, the header pipe having at least one connecting mechanism extending outward from the header pipe. The exhaust header pipe and duct system also includes an air duct surrounding the header pipe and mounted to the connecting mechanism, the air duct forming a cooling air path between the air duct and the header pipe for at least a length of the alternator in the standby generator.

In accordance with another aspect of the invention, a method of manufacturing a generator includes providing a multi-chamber generator enclosure having a power train chamber having a first intake passage and a first exhaust passage, and positioning an engine and an alternator driven by the engine within the power train chamber. The method also includes positioning an engine cooling fan in the multi-chamber generator enclosure such that the engine cooling fan is operable to draw a first stream of cooling air into the power train chamber through the first intake passage and drive the first stream of cooling air over the engine. The method further includes positioning an exhaust system within the power train chamber, the exhaust system being operatively coupled to the engine and extending from the engine out of power train chamber through the first exhaust passage, and positioning within the power train chamber a heat duct that substantially surrounds the exhaust system from the engine through the power train chamber.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The operating environment of the invention is described with respect to a home or business standby generator. However, it will be appreciated by those skilled in the art that the invention is equally applicable for use with portable or other generators. Moreover, the invention will be described with respect to heat and air flow management within an enclosure for a generator. However, one skilled in the art will further appreciate that the invention is equally applicable for use with respect to heat and air flow management within an enclosure having a heat generating prime mover, such as an internal combustion engine.

Figure 1:
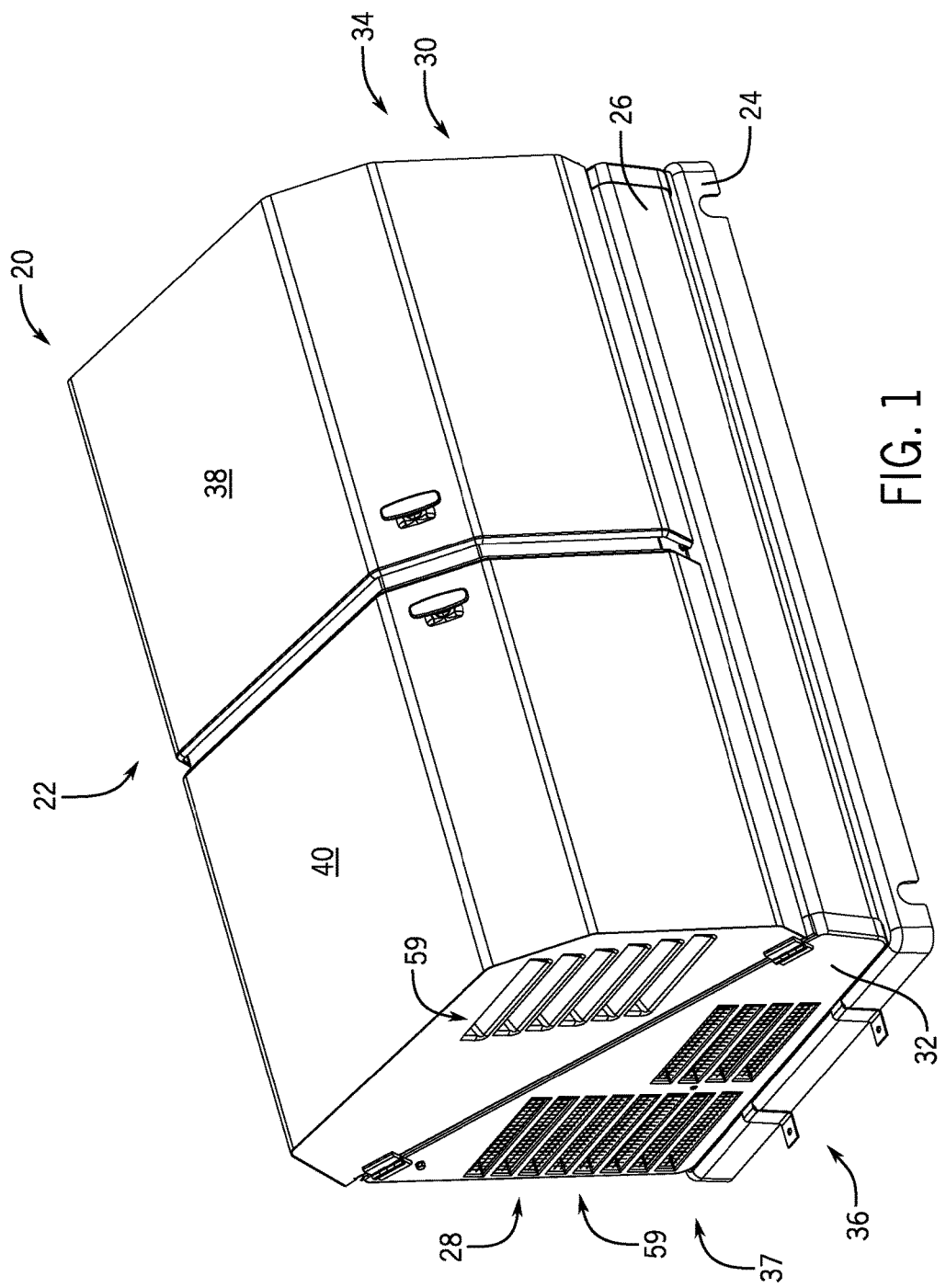
FIG. 1 is a front, left side perspective view of a generator incorporating the present invention.

Referring to FIG. 1, a standby generator 20 is shown, according to embodiments of the invention. The standby generator 20 couples to an electrical distribution panel of a building and is configured to provide a backup supply of electricity in case power outages occur in the utility grid. The standby generator 20 has a prime mover that drives an alternator to produce electrical power. The prime mover may comprise an internal combustion engine having a crankshaft operatively coupled to a shaft of the alternator. The generator and alternator are referred to as an engine-generator set.

In accordance with an exemplary embodiment of the invention, the standby generator 20 has an enclosure 22 to provide protection against weather and to insulate noise emanating from the generator. The enclosure 22 has a rectangular base 24 to support an engine-generator set. A front wall 26 and a back wall 28 extend vertically from the base 24 along the length of the enclosure 22. A first side wall 30 located on the right side and a second side wall 32 located on the left side extend vertically from the base 24 at a respective first end 34 and second end 36 of the enclosure 22. Together, the base 24, first and second side walls 30 and 32, and the front and back walls 26 and 28 form an enclosure frame 37. The enclosure 22 also has a first door 38 and a second door 40 that cover the enclosure 22 when the doors are closed. In one embodiment of the invention, a generator has an enclosure 22 comprising a frame assembly 37 and a pair of opposing, substantially symmetrical doors 38, 40 enclosing the frame 37 on a top side of the generator.

Figure 2:
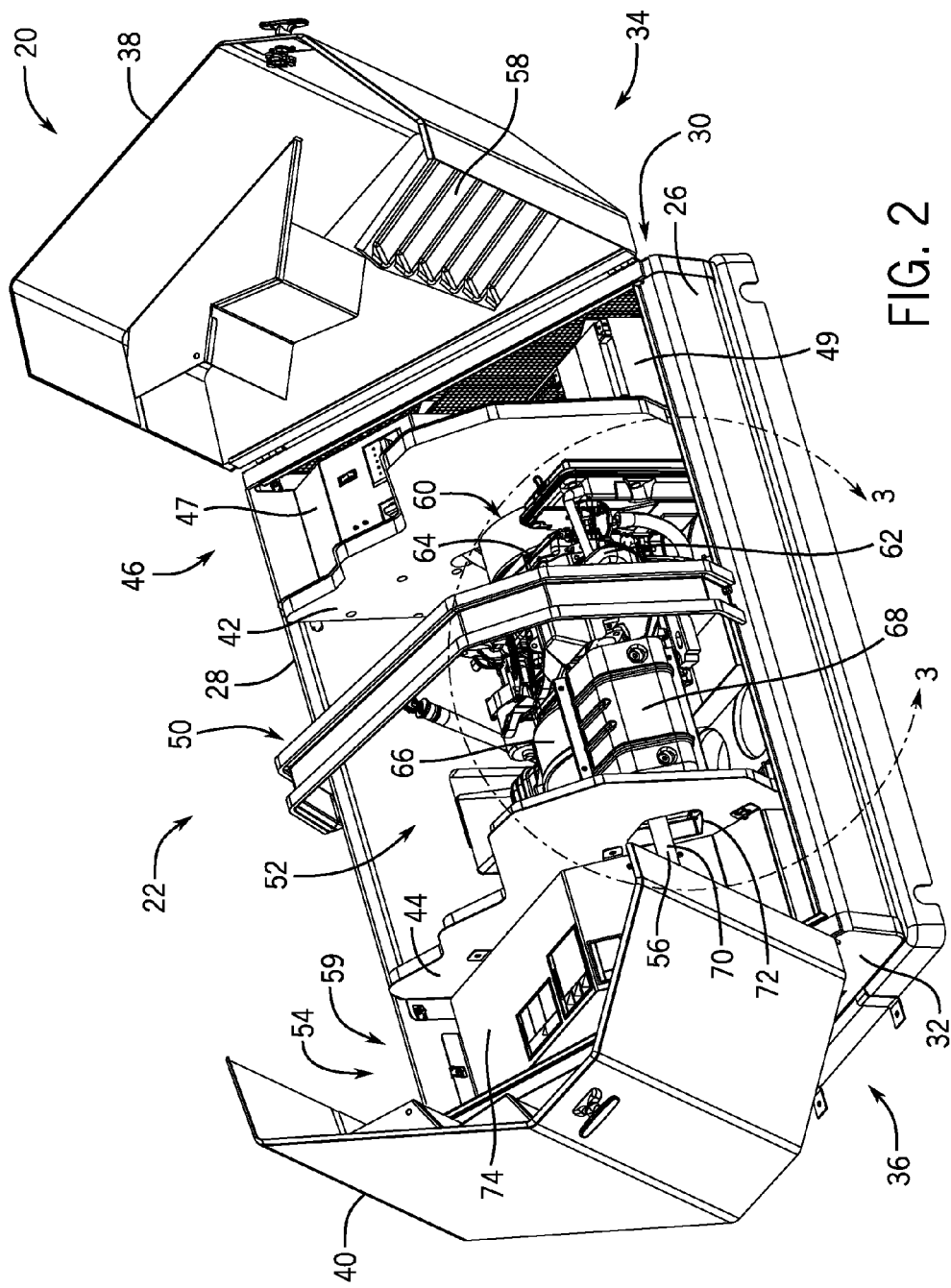
FIG. 2 is a perspective view of the generator of FIG. 1 with doors of the enclosure in an open position.

Referring to FIG. 2, standby generator 20 is shown with a first door 38 and second door 40 in an open position, in accordance with an embodiment of the invention. The standby generator 20 may be separated into three chambers by a first partition wall 42 and a second partition wall 44 that extend across the enclosure 22 from the front wall 26 to the back wall 28. A control chamber 46 is located between the first side wall 30 and the first partition wall 42. The control chamber 46 houses a control system 47 to operate the generator, an air filter to filter intake air to the engine, and a battery 49 for starting the engine, as well as other ancillary components. A power train chamber 50 is located between the first partition wall 42 and the second partition wall 44 to house the engine-generator set 52 and related components. An exhaust chamber 54 is located between the second partition wall 44 and the second side wall 32. The exhaust chamber 54 houses exhaust system components 56 and other ancillary components and ejects exhaust to the environment.

The control chamber 46 receives cooling air from the environment through a first set of louvers 58 in the first door 38 to provide an inlet for the cooling air. The louvers 58 provide cooling air to cool the control system 47 and other components within control chamber 46 and direct air to the power train chamber 50 through openings 60 in the first partition wall 42. The openings 60 are adjacent the internal combustion engine 62 and an engine fan 64 that drives the cooling air through the openings 60 and over the engine 62. The engine fan 64 provides a driving force to pull air into the control chamber 46 from the environment and/or a separate fan may be located in the control chamber 46. The control chamber 46 also insulates noise that may emanate through the openings 60 in the first partition wall 42.

The power train chamber 50 houses the engine-generator set 52 which preferably includes an internal combustion engine 62 and an alternator 66 driven by the internal combustion engine 62. The internal combustion engine 62 may include one or more cylinders with each cylinder having a piston slidably positioned within each cylinder. Combustible fuel is provided to each cylinder through a respective intake valve that is then compressed and ignited causing reciprocal motion of the pistons. The reciprocal motion of the pistons is converted to rotational motion of a crankshaft. The crankshaft is coupled to an alternator shaft to drive the alternator 66 and provide electrical energy for distribution from the standby generator 20.

In an exemplary embodiment of the invention, the engine-generator set 52 has a horizontal shaft arrangement and is positioned so that the internal combustion engine 62 is located toward the first end 34 of the enclosure 22 from the alternator 66. The engine fan 64 is driven by the crankshaft and faces the control chamber 46. The engine fan 64 pulls air through the first partition wall 42 to cool the engine 62 and blows the air through a heat duct assembly 68 into the exhaust chamber 54. The alternator 66 may have an exhaust fan driven by the alternator shaft and located opposite the internal combustion engine 62. The exhaust fan pulls cooling air axially through the alternator 66 and drives it into the exhaust chamber 54. In one embodiment of the invention, the heat duct assembly 68 may direct cooling air expelled from the engine 62 into the exhaust chamber 54 so that it bypasses the exhaust fan to reduce fan size and power consumption. Accordingly, the heat duct assembly 68 may be in a generator having an enclosure 22 with multiple chambers to separate components and manage heat transfer therein.

The exhaust chamber 54 houses exhaust system components 56 and receives expelled cooling air from the alternator 66 and internal combustion engine 62 before venting the exhaust to the environment. The second partition wall 44 may have openings for receiving the expelled cooling air from the alternator 66 and the internal combustion engine 62. The exhaust chamber 54 may also house an exhaust fan which may extend through one of the openings in the second partition wall 44. The exhaust chamber 54 may allow exhaust to dissipate within the chamber before expelling the exhaust safely to the environment. The cooling air may be expelled to the environment through openings in the chamber walls. As shown in FIG. 1, a second set of louvers 59 are provided in the second door 40 to provide openings to expel the cooling air, and/or such vents may be located in the rear wall 28, as show in FIG. 2. The exhaust chamber 54 also insulates noise emanating from the engine 62 and alternator 66.

The exhaust system 56 may have an exhaust pipe 70 for the internal combustion engine 62 which may extend through one of the openings 72 in the second partition wall 44. The exhaust pipe 70 is coupled to the internal combustion engine 62 to remove combustion gases and may deliver the combustion gases to a muffler located within a muffler box 74. The muffler box 74 is preferably located in the lower back corner of the exhaust chamber 54 and may have an opening in the front for the exhaust pipe 70. The exhaust pipe 70 may make a ninety degree bend before entering the muffler box 74 so that cooling air from the engine 62 can bypass the muffler box 74 to exit through the side of the enclosure 22. The muffler box 74 may prevent combustion gases from filling the exhaust chamber 54 and direct exhaust out the back of the enclosure 22 and away from operators at the front.

Figure 3:
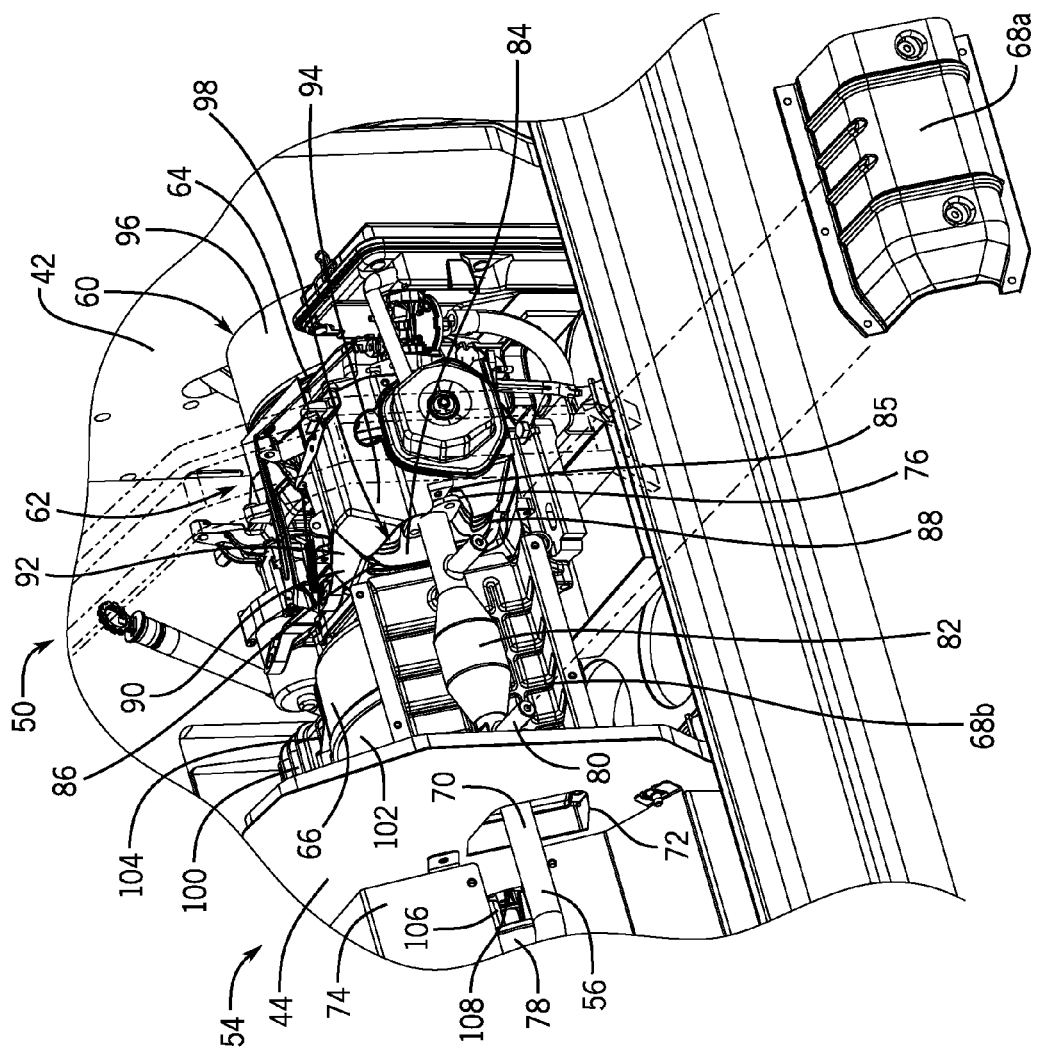
FIG. 3 is a detailed partial perspective view of the generator of FIG. 2 taken along line 3-3 with a heat shield exploded therefrom.
Figure 4:
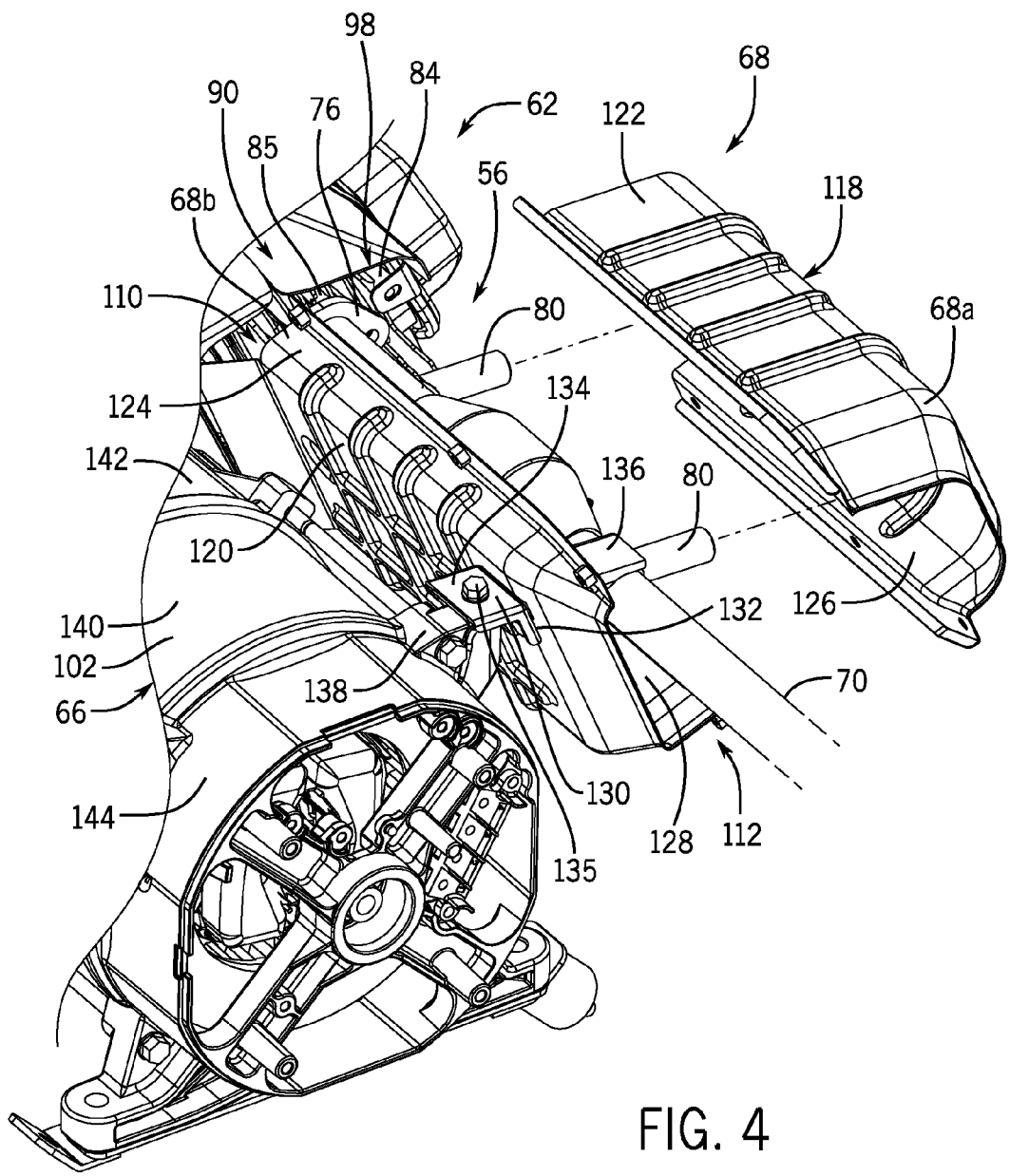
FIG. 4 is a perspective view from an end of the generator depicting an alternator and exhaust system of the generator with a heat shield exploded off the exhaust.

Referring now to FIG. 3, a detailed view of a section taken along line 3-3 of FIG. 2 shows a power train chamber 50 with a portion of the heat duct assembly 68 as removed from the exhaust system 56, according to an embodiment of the invention. The exhaust system 56 couples to the internal combustion engine 62 to remove exhaust gases after combustion. The exhaust system 56 may have an exhaust pipe 70 with a mounting flange 76 for mounting to the internal combustion engine 62. The exhaust pipe 70 extends outward from the engine 62 in the direction of the exhaust chamber 54 and extends through an opening 72 in the second partition wall 44 to the exhaust chamber 54. Within the exhaust chamber 54, the exhaust pipe 70 may make a ninety degree bend to enter the muffler box 74. A muffler 78 is located within the muffler box 74 and couples to the exhaust pipe 70. As shown in FIGS. 3 and 4, the exhaust pipe 70 may have connecting members 80 extending radially from the pipe for coupling the heat duct portion 68a to the pipe within the power train chamber 50. The exhaust system 56 may have an exhaust component 82 which may comprise a resonator chamber, catalytic converter, muffler, expansion chamber or a heat sink, and the exhaust component 82 may be located within the power train chamber and surrounded by the heat duct assembly 68.

The exhaust system 56 couples to a cylinder head 84 of the internal combustion engine 62. The cylinder head 84 is coupled to a cylinder block 86 and the cylinder head 84 may have an exhaust port to expel exhaust gases generated within the cylinders. The cylinder head 84 has a mounting flange 85 around the exhaust port that mates with the mounting flange 76 of the exhaust pipe 70. The cylinder block 86 and cylinder head 84 may have cooling fins 88 located around their periphery for dissipating heat generated during combustion. The engine 62 may have engine covers 90 comprising a cylinder block cover 92 and a cylinder head cover 94. The engine covers 90 may have a first opening facing the first end of the enclosure and a second opening facing the second end of the enclosure to provide an inlet and an outlet for cooling air.

As best shown in FIG. 3, the internal combustion engine 62 may have an engine fan 64 that drives cooling air through the inlet and outlet in the engine covers. The engine fan 64 is driven by the crankshaft and is located on the opposite side of the engine 62 from the alternator 66. The engine fan 64 may be positioned within an opening 60 in the first partition wall 42, and a shroud 96 may be coupled to the first partition wall 42 to surround the engine fan 64 and define the opening 60. The engine fan 64 may create a first stream of air within the enclosure 22 that is driven from the control chamber 46 within the engine covers 90 and over the cooling fins 88 to cool the engine 62.

The heat duct assembly 68 may be located adjacent the cooling air outlet 98 to direct the first stream of air from the engine 62 into the exhaust chamber 54. The heat duct assembly 68 may be located within the power train chamber 50 and may extend from the internal combustion engine 62 to the exhaust chamber 54. The heat duct assembly 68 may provide a heat shield for the exhaust pipe 70 to reduce heat transfer from the pipe into the power train chamber 50. The heat duct assembly 68 may direct the first stream of air over the exhaust pipe 70 to cool the pipe. The heat duct assembly 68 may reduce the amount hot air from the engine 62 circulating within the power train chamber 50 so that components within the chamber operate at cooler temperatures. In one embodiment of the invention, the heat duct assembly 68 may direct heat from the engine 62 away from the alternator 66 so that the alternator operates at cooler temperatures.

The power train chamber 50 may have an air duct 100 for supplying cooling air to the alternator 66. The alternator 66 may be located in an alternator housing 102 with an air passage 104 for receiving the cooling air. The air passage 104 may be coupled to the air duct 100 that leads to an opening in the back wall of the enclosure 22 to receive cooling air from the environment. The cooling air may be drawn into the alternator housing 102 by the exhaust fan 106. The exhaust fan 106 may be driven by the alternator shaft and be located on the opposite side of the alternator 66 from the engine 62. The exhaust fan 106 may create a second stream of air within the enclosure 22 by drawing cooling air in through the air duct 100 and axially through the alternator 66 to cool the alternator 66. The second stream of air may be expelled into the exhaust chamber 54 through an opening 108 in the second partition wall 44, and the exhaust fan 106 may extend into the exhaust chamber 54 through the opening 108.

Referring to FIG. 4, a more detailed top side view shows portions of the generator disassembled. The heat duct assembly 68 includes portions 68a and 68b. An inlet 110 and an outlet 112 are on opposite ends of the exhaust pipe 70 so that the inlet 110 is in line with the cooling air outlet 98 of the engine covers 90. The heat duct assembly 68 comprises first component 68a and second component 68b that couple together to surround the exhaust pipe 70. The heat duct assembly 68 has a front surface 118 as part of the first component 68a and a back surface 120 as part of the second component 68b. The first component 68a and the second component 68b each has a first side piece 122, 124 and a second side piece 126, 128, respectively, that extend from the respective front surface 118 and back surface 120 along the length of the heat duct assembly 68. The first side pieces 122, 124 mate together and the second side pieces 126, 128 mate together so that the first component 68a and the second component 68b encircle the exhaust pipe 70.

The heat duct assembly 68 may be located near the front of the enclosure 22 because the internal combustion engine 62 may be tilted toward the front of the enclosure 22 for accessibility to the cylinder head 84. Accordingly, the heat duct assembly 68 may be positioned in front of the alternator 66 and may be oriented on the exhaust system 56 so that the back surface 120 faces the alternator 66. The back surface 120 may be evenly spaced from the alternator 66 so that the first side piece 124 and second side piece 128 along the back surface 120 are equal distance from the alternator shaft. The front surface 118 of the heat duct assembly 68 may be parallel to the back surface 120 and face the upper front end of the enclosure 22.

The first component 68a may have a first side piece 122 that extends horizontally from the front surface 118 and a second side piece 126 that extends perpendicular from the front surface 118. The second component 68b may have a first side piece 124 and a second side piece 128 that extend perpendicular from the back surface 120. The corners between the side pieces and the respective front surface 118 and back surface 120 may be rounded and the corners of the first component 68a may have a larger radius than the corners of the second component 68b.

The heat duct assembly 68 may have a bracket 130 extending outwards from the back surface 120 for coupling the duct to the alternator housing 102. The bracket 130 is preferably angled with a first arm 132 mounted to the back surface 120 and a second arm 134 that extends horizontally from the back surface 120 when the duct is mounted on the exhaust. The second arm 134 has an opening for receiving a fastener 135 to couple to the alternator housing 102. The bracket 130 may have edges that extend perpendicular to the first arm 132 and second arm 134 for added structural integrity.

The bracket 130 and the back surface 120 have openings through which an exhaust support 136 extends. The openings may be slots and the exhaust support 136 may be a bracket that couples the exhaust pipe 70 to the alternator housing 102. The exhaust support 136 extends to the alternator housing 102 next to the second arm 134 so that the exhaust support 136 and second arm 134 are coupled to the alternator housing 102 at the same location. In another embodiment, the bracket 130 may be positioned adjacent the opening in the back surface 120 without an opening in the first arm 132.

The exhaust support 136 preferably extends outward from the exhaust pipe 70 and couples to the alternator housing 102. The exhaust support 136 may be a straight bracket with a first end that mounts tangent on the exhaust pipe and the second end may have an opening for a fastener 135 to couple the support to the alternator housing 102. The exhaust support 136 may have edges that are bent perpendicular to the main surface for added strength. The edges may extend along the length of the exhaust support 136 but short of the first end so the surface of the support may couple to the exhaust pipe 70. The exhaust support 136 may extend through the slot provided in the second component 68b and extend to the alternator 66.

The exhaust support 136 may extend horizontally and adjacent the heat duct bracket 130 so that the exhaust support 136 and the heat duct bracket 130 may be coupled together to the alternator housing 102. The exhaust support 136 may fit within the edges of the heat duct bracket 130 and lie flush against the heat duct bracket 130. The second end of the exhaust support 136 may have an opening provided for receiving the same fastener 135 used to couple the heat duct bracket 130 to the alternator housing 102. The opening in the exhaust support 136 may comprise a first slot and the opening in the heat duct bracket 130 may comprise a second slot. The first and second slots may be positioned at right angles to each other to ensure sufficient alignment in the respective openings for receiving the fastener 135.

The exhaust support 136 and the heat duct bracket 130 may be coupled together to an alternator bracket 138. The alternator bracket 138 may be integral to one used to hold the alternator housing 102 together. The housing may include a stator cover 140 between a crankcase cover 142 and an end cover 144. The crankcase cover 142 and the end cover 144 may have brackets that receive bolts to clamp the housing together. A bracket on the end cover 144 may be configured to receive an additional fastener 135 to couple the heat duct bracket 130 and the exhaust support 136 to the alternator housing 102. The alternator bracket 138 may have a horizontal flat surface that mates flush with the heat duct bracket 130 and the exhaust support 136.

Figure 5:
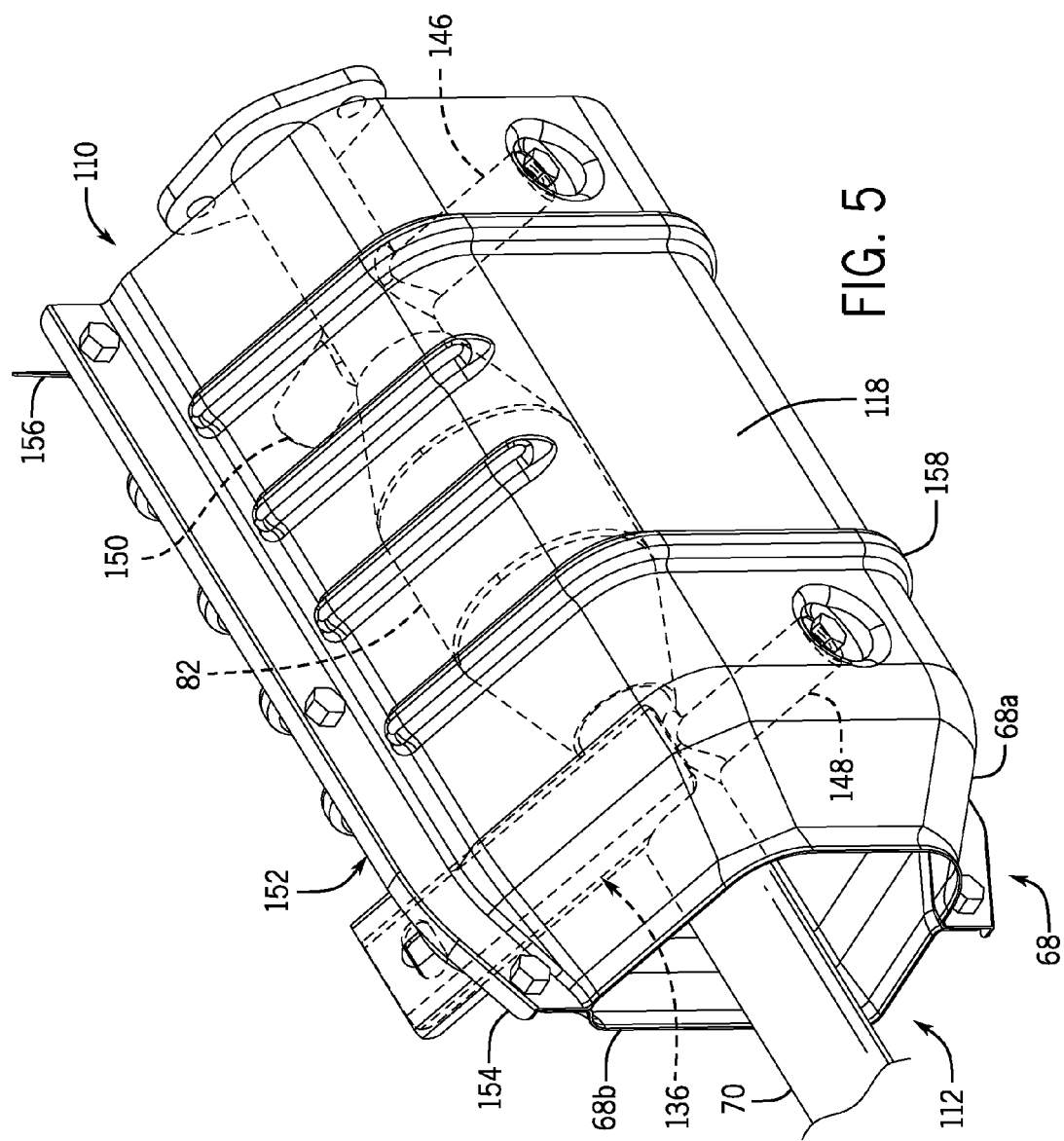
FIG. 5 is a front top perspective view of a heat management system of the generator.
Figure 6:
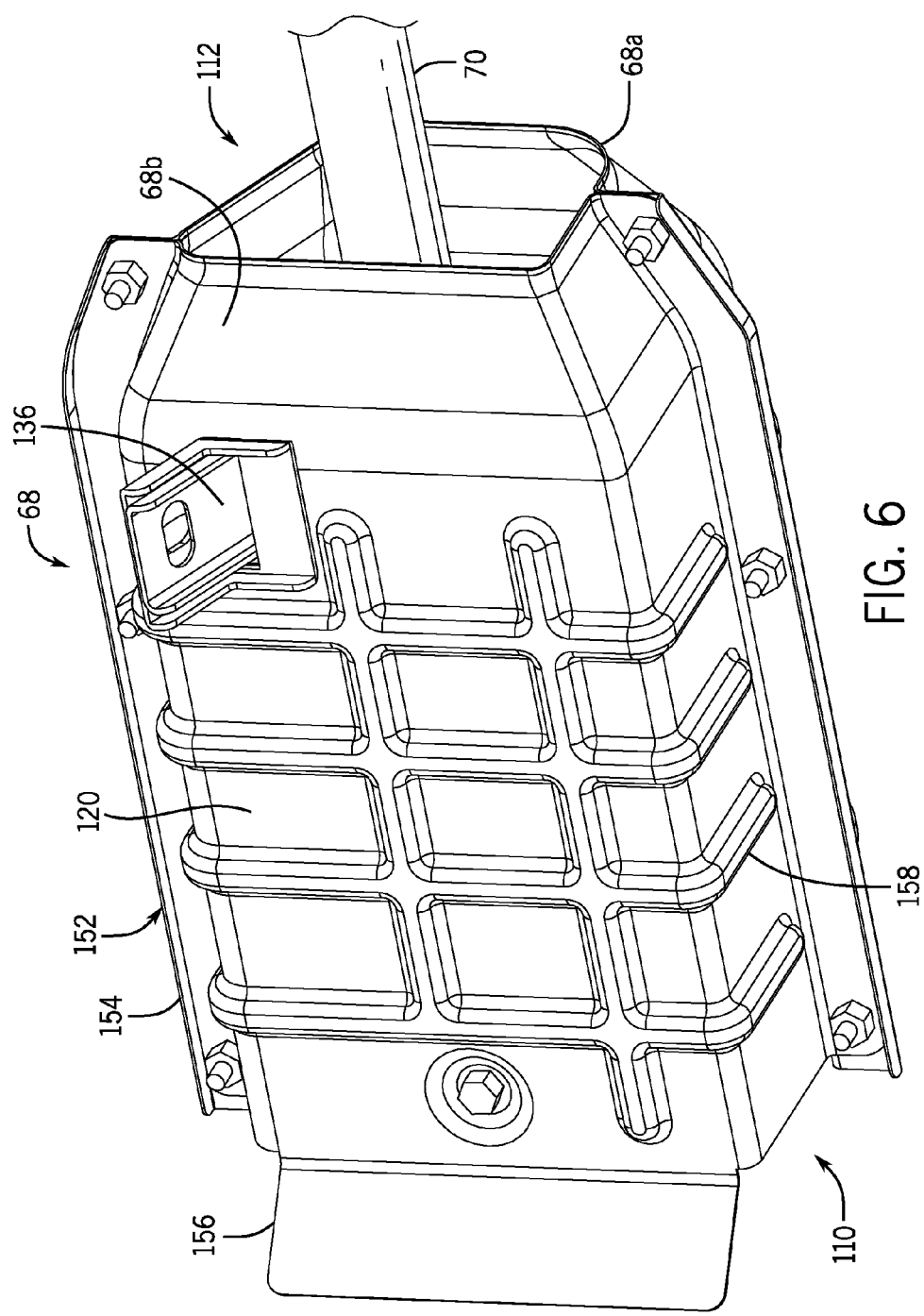
FIG. 6 is a back bottom perspective view of the heat management system of FIG. 5.

Referring now to FIGS. 5 and 6, heat duct assembly 68 is shown coupled to exhaust pipe 70, in accordance with an embodiment of the invention. The exhaust pipe 70 preferably has supporting members that couple the heat duct assembly 68 to the exhaust pipe 70. A first supporting member 146 and a second supporting member 148 may extend outward from the exhaust pipe 70 horizontally to the front surface 118 of the heat duct assembly 68. The first supporting member 146 and second supporting member 148 may be located on either side of an exhaust component 82 which may comprise a resonator chamber, catalytic converter, muffler, expansion chamber or a heat sink. A third supporting member 150 may extend outward from the exhaust pipe 70 to the back surface 120 of the heat duct assembly 68. The third supporting member 150 may be located upstream of the exhaust component 82 and may extend toward the alternator 66 so that it is perpendicular to the back surface 120. The first supporting member 146 and second supporting member 148 may couple to the first component 68a while the third supporting member 150 and the exhaust support 136 couple to the second component 68b.

The heat duct assembly 68 may be oblong having an inlet 110 and an outlet 112 at the ends to direct the first stream of air into the exhaust chamber 54. The heat duct assembly 68 may have a first component 68a and a second component 68b that couple to each other along two sides of the duct to fit around the exhaust pipe 70. The first component 68a and second component 68b may couple together by a first and second pair of mating flanges 152 located along the length of the duct. Each component may have a first flange on a first side and a second flange on a second side of the duct that mate with a corresponding flange of the other component. The flanges 152 may comprise a flat surface extending outwards from the components and one of each mating pair may have lip 154 along the outer edge to guide the mating flange into position. The flanges 152 may have openings for receiving fasteners and a nut or a boss with a tapped hole may be affixed to the openings to receive a bolt as the fastener.

The heat duct assembly 68 may fit around the exhaust pipe 70 so that the inlet 110 corresponds to the cooling air outlet 98 of the engine covers 90. The heat duct assembly 68 may be mounted on the exhaust pipe 70 so that the inlet 110 is near the cooling air outlet 98 of the engine 62 and spaced apart from the engine 62 so that the heat duct assembly 68 does not vibrate against the engine 62. The first component 68a preferably has an inlet profile that matches the outlet opening in the cylinder head cover 94. The second component 68b preferably has a directional member 156 that extends beyond the inlet 110 and flares outward to direct the first stream of air into the heat duct assembly 68. The directional member 156 may extend from the back surface 120 substantially to the cylinder block cover 92 and extends along the width of the back surface 120. In another embodiment of the invention, the inlet 110 of the heat duct assembly may couple directly to one or more of the cylinder block cover 92 and cylinder head cover 94.

The heat duct assembly 68 may have an outlet profile that corresponds to the profile of the opening 72 (FIG. 2) in the second partition wall 44. The outlet 112 may be tapered into the duct which may aid in directing the first stream of air into the exhaust chamber 54. The heat duct assembly 68 may be coupled to the exhaust pipe 70 so that the outlet 112 is spaced apart from the opening 72 (FIG. 2) in the second partition wall 44. In other embodiments of the invention, the heat duct assembly 68 is coupled to the exhaust pipe 70 so that the outlet 112 is flush with the second partition wall 44 or extends through the opening 72 (FIG. 2) in the second partition wall 44. In some embodiments of the invention, the heat duct assembly 68 may have a uniform profile along its length and may comprise a tube of circular, triangular, rectangular or other cross sectional shapes.

The first component 68a and the second component 68b may be made of sheet metal. The first component 68a and the second component 68b may be formed by stamping the sheet metal to form the contours of the components. The sheet metal may include strengthening ribs 158 extending from the surface of the heat duct assembly 68. The strengthening ribs 158 may comprise a V-shaped or radiused indentation formed by an embossing process. The strengthening ribs 158 may extend from the first of the flanges 152 to the second of the flanges 152, and the strengthening ribs 158 may extend along the length of the components 68a, 68b. The strengthening ribs 158 along the length of the components 68a, 68b may intersect the strengthening ribs 158 along the width of the components 68a, 68b.

Figure 7:
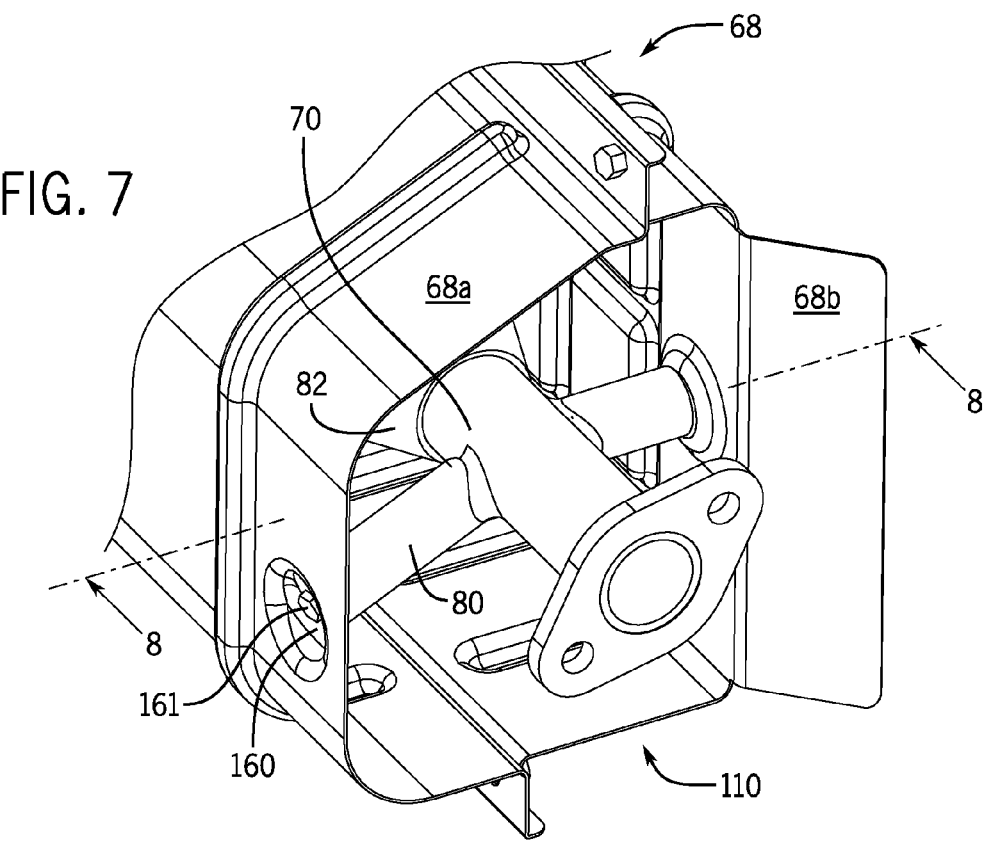
FIG. 7 is a top perspective view of an inlet to the heat management system of FIGS. 5 and 6.
Figure 8:
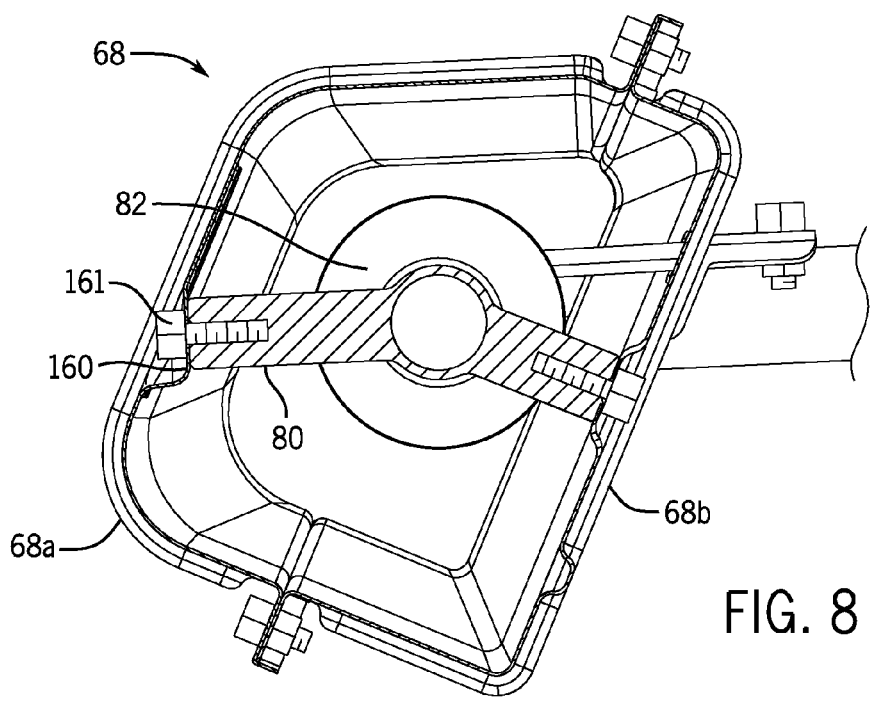
FIG. 8 is a cross-sectional view of the heat management system of FIGS. 5-7 taken along line 8-8 of FIG. 7.

Referring to FIGS. 7 and 8, opposite ends of the exhaust and heat duct assembly is shown. An exhaust pipe 70 may have one or more connecting members 80 extending radially outwards from the pipe for coupling the heat duct assembly 68 to the exhaust pipe 70, in accordance with an embodiment of the invention. The exhaust pipe 70 has connecting members 80 at one or more locations along the length of the exhaust pipe 70 to support the inlet 110 and outlet 112 of the heat duct assembly 68. The connecting members 80 may comprise rods having a first end welded to the exhaust pipe and a second end fastened to the heat duct assembly 68. The second end may have a flat face perpendicular to the axis of the rod and a tapped hole for receiving a bolt. The connecting members 80 may also have sufficient length so that the heat duct assembly 68 fits around an exhaust component 82.

The heat duct assembly 68 may have indentations 160 along the surface that provide fastening locations to couple the heat duct assembly 68 to the connecting members 80. The indentations 160 create a surface parallel to the end of the support rod and have an opening for receiving a fastener 161. The indentations 160 allow a fastener 161 to mate flush with the surface of the heat duct assembly 68 when the heat duct assembly 68 is fastened to the connecting members 80. The indentations 160 may also provide a recess for the fastener head so that the head does not extend beyond the outer surface of the heat duct assembly 68. The heat duct assembly 68 may comprise fasteners for coupling the heat duct assembly 68 to the exhaust pipe 70 and for coupling the first component 68a to the second component 68b.

Beneficially, embodiments of the invention provide a heat management system for an electrical generator. The system may include a heat duct assembly positioned within a generator enclosure configured to improve air flow and heat management of the generator. The heat duct assembly may mount around an exhaust pipe so that the inlet is positioned to receive cooling air exhaust from an engine and the outlet delivers the cooling air to an exhaust chamber within the enclosure. The improved heat management and air flow reduces the size requirements and power consumption of generators within the enclosure. The system allows for lower operating temperatures and increase in efficiency of the engine-generator set.

Therefore, according to one embodiment of the invention, a generator includes a multi-chamber generator enclosure, an engine mounted within the multi-chamber generator enclosure, and an alternator driven by the engine and positioned within at least one chamber of the multi-chamber generator enclosure. The generator also includes an exhaust system operatively coupled to the engine and extending from the engine through at least the at least one chamber of the multi-chamber generator enclosure having the alternator therein, and a heat shield substantially surrounding the exhaust system in the at least one chamber of the multi-chamber enclosure generator containing the alternator.

According to another embodiment of the invention, an exhaust header pipe and duct system for a standby generator having an alternator is provided. The exhaust header pipe and duct system includes a header pipe coupleable to an internal combustion engine to receive exhaust therefrom, the header pipe having at least one connecting mechanism extending outward from the header pipe. The exhaust header pipe and duct system also includes an air duct surrounding the header pipe and mounted to the connecting mechanism, the air duct forming a cooling air path between the air duct and the header pipe for at least a length of the alternator in the standby generator.

According to yet another embodiment of the invention, a method of manufacturing a generator includes providing a multi-chamber generator enclosure having a power train chamber having a first intake passage and a first exhaust passage, and positioning an engine and an alternator driven by the engine within the power train chamber. The method also includes positioning an engine cooling fan in the multi-chamber generator enclosure such that the engine cooling fan is operable to draw a first stream of cooling air into the power train chamber through the first intake passage and drive the first stream of cooling air over the engine. The method further includes positioning an exhaust system within the power train chamber, the exhaust system being operatively coupled to the engine and extending from the engine out of power train chamber through the first exhaust passage, and positioning within the power train chamber a heat duct that substantially surrounds the exhaust system from the engine through the power train chamber.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator comprising:
   a multi-chamber generator enclosure comprising a plurality of chambers, the plurality of chambers including at least a power train chamber and an exhaust chamber separated by a partition wall of the multi-chamber generator enclosure;
   an engine mounted within the power train chamber;
   an alternator driven by the engine and positioned within the power train chamber;
   an exhaust system comprising an exhaust pipe and muffler, the exhaust pipe coupled to the engine and extending from the engine through the power train chamber to the muffler in the exhaust chamber; and
   a heat shield substantially surrounding the exhaust pipe in the power train chamber.

2. The generator of claim 1 further comprising a cooling air source located up stream of the alternator, and wherein cooling air is funneled between the heat shield and the exhaust pipe within the power train chamber.

3. The generator of claim 2, wherein the heat shield expels cooling air from the power train chamber through an exhaust pipe passage located between the power train chamber and the exhaust chamber.

4. The generator of claim 2, wherein the engine is an air cooled engine having cooling fins; and
   wherein the cooling air source is located upstream of the engine and drives cooling air over the cooling fins to cool the engine before cooling air is funneled between the heat shield and the exhaust system.

5. The generator of claim 4, wherein the engine comprises an engine cover covering the cooling fins, the engine cover having an inlet and an outlet for cooling air to flow over the cooling fins to cool the engine, the outlet positioned around the exhaust system so that the exhaust system extends from the engine through the outlet.

6. The generator of claim 4,
   wherein the heat shield extends substantially along the exhaust system from the engine to the exhaust pipe passage and expels cooling air through an exhaust pipe passage located between the power train chamber and the exhaust chamber.

7. The generator of claim 4, wherein the cooling air source comprises an engine driven fan.

8. The generator of claim 2, wherein the multi-chamber generator enclosure further comprises a forward chamber in fluid communication with the power train chamber and having an air inlet for drawing in air from the environment; and wherein the engine comprises an engine fan for cooling the engine, the engine fan providing the cooling air source by drawing cooling air into the power train chamber from the forward chamber and driving cooling air over the engine.

9. The generator of claim 8, wherein the exhaust chamber is in fluid communication with the power train chamber and comprises an air outlet for expelling air to the environment;
wherein the heat shield directs cooling air into the exhaust chamber; and
the generator further comprising an exhaust fan driven by the alternator and positioned in the exhaust chamber, the exhaust fan cooling the alternator by drawing air through the alternator and expelling the air drawn through the alternator into the exhaust chamber.

10. The generator of claim 1 wherein the multi-chamber generator enclosure comprises a frame and a pair of opposing, substantially symmetrical doors enclosing the frame on a top side of the generator.

11. The generator of claim 1 wherein the exhaust pipe comprises at least one connecting mechanism extending outward from the exhaust pipe; and
wherein the heat shield is mounted to the at least one connecting mechanism.

12. The generator of claim 1 wherein a portion of the heat shield is positioned between the alternator and the exhaust pipe.

13. A method of manufacturing a generator, the method comprising:
providing a multi-chamber generator enclosure having a power train chamber having a first intake passage and a first exhaust passage;
positioning an engine and an alternator driven by the engine within the power train chamber;
positioning an engine cooling fan in the multi-chamber generator enclosure such that the engine cooling fan is operable to draw a first stream of cooling air into the power train chamber through the first intake passage and drive the first stream of cooling air over the engine;
positioning an exhaust system within the power train chamber, the exhaust system being operatively coupled to the engine and extending from the engine out of power train chamber through the first exhaust passage; and
positioning a heat duct that substantially surrounds the exhaust system in the power train chamber.

14. The method of claim 13, wherein the power train chamber further comprises a second intake passage and a second exhaust passage; and further comprising:
coupling an alternator cooling fan to the alternator to draw a second stream of cooling air into the power train chamber through the second intake passage and through the alternator and expel the second stream of cooling air from the power train chamber through the second exhaust passage.

15. The method of claim 14, wherein the engine cooling fan is positioned upstream of the alternator and engine and the alternator cooling fan is located downstream of the alternator and engine.

16. The method of claim 15, wherein the exhaust system extends from the engine through the power train chamber downstream from the engine cooling fan.

17. The method of claim 14, wherein the multi-chamber generator enclosure further comprises an exhaust chamber having an exhaust port to expel air to the environment and in communication with the power train chamber through the first and second exhaust passages.

18. The method of claim 17, wherein the multi-chamber generator enclosure further comprises an intake chamber having an intake port to receive air from the environment and in communication with the power train chamber through at least the first intake passage.

19. The method of claim 18, wherein the engine cooling fan is positioned in the first intake passage and the alternator cooling fan is positioned in the exhaust chamber and coupled to the alternator through the second exhaust passage.

20. The method of claim 17, wherein the exhaust system comprises a muffler positioned in the exhaust chamber.

21. The method of claim 13, wherein the heat duct extends substantially to the engine and substantially to the first exhaust passage.

22. The method of claim 13 further comprising positioning a portion of the heat duct between the alternator and the exhaust system.

23. A generator comprising:
a generator enclosure comprising at least a power train chamber separated from an exhaust chamber by a partition;
an engine mounted within the power train chamber;
an alternator driven by the engine and mounted within the power train chamber;
an exhaust pipe extending from the engine and into the exhaust chamber through an opening in the partition; and
a heat shield positioned within the power train chamber between the exhaust pipe and the alternator.

24. The generator of claim 23 wherein the heat shield comprises a channel that directs air expelled from the engine into the exhaust chamber.

25. The generator of claim 23 wherein the heat shield comprises a pair of components coupled together to substantially surround the exhaust pipe, and wherein one component of the pair of components is positioned between the exhaust pipe and the alternator.

26. The generator of claim 23 wherein the alternator is positioned within an alternator housing; and
wherein the heat shield is coupled to the alternator housing.

27. The generator of claim 23 wherein the heat shield is coupled to the exhaust pipe.

28. The generator of claim 23 further comprising an exhaust component positioned along a length of the exhaust pipe; and
wherein the exhaust component is surrounded by the heat shield.

* * * * *